United States Patent
Rudrapatna

(10) Patent No.: US 10,263,682 B2
(45) Date of Patent: Apr. 16, 2019

(54) CHANNEL STATE PREDICTION BASED ON PREDICTION OF CHANNEL STATE FACTORS

(71) Applicant: Ashok Rudrapatna, Basking Ridge, NJ (US)

(72) Inventor: Ashok Rudrapatna, Basking Ridge, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 36 days.

(21) Appl. No.: 15/384,462

(22) Filed: Dec. 20, 2016

(65) Prior Publication Data

US 2018/0175926 A1 Jun. 21, 2018

(51) Int. Cl.
*H04B 7/06* (2006.01)
*H04L 12/26* (2006.01)

(52) U.S. Cl.
CPC ......... *H04B 7/0632* (2013.01); *H04B 7/0639* (2013.01); *H04L 43/0864* (2013.01)

(58) Field of Classification Search
None
See application file for complete search history.

(56) References Cited

U.S. PATENT DOCUMENTS

| | | | | |
|---|---|---|---|---|
| 2003/0202574 | A1* | 10/2003 | Budka | H04L 1/0003 375/227 |
| 2007/0005749 | A1* | 1/2007 | Sampath | H04B 7/0417 709/223 |
| 2011/0261713 | A1* | 10/2011 | Kishiyama | H04W 72/1226 370/252 |
| 2013/0329753 | A1* | 12/2013 | Koumoto | H04L 43/0858 370/503 |
| 2015/0117237 | A1* | 4/2015 | Wang | H04B 7/024 370/252 |
| 2016/0127247 | A1* | 5/2016 | Anzai | H04L 47/365 370/230 |
| 2017/0141903 | A1* | 5/2017 | Xu | H04L 5/0055 |

* cited by examiner

*Primary Examiner* — Faruk Hamza
*Assistant Examiner* — Cassandra L Decker
(74) *Attorney, Agent, or Firm* — Tong, Rea, Bentley & Kim, LLC

(57) ABSTRACT

The present disclosure generally discloses a channel state prediction capability. In a communication system including a transmitter and a receiver communicating via a communication channel, the channel state prediction capability may enable the transmitter to transmit to the receiver via the communication channel based on a predicted channel state of the communication channel. The predicted channel state may be a prediction of the channel state at a future time at which data transmitted by the transmitter is expected to be received by the receiver, which may be based on a total round trip latency of the communication channel. The predicted channel state may include one or more parameters (e.g., a predicted channel quality indicator, a predicted rank indicator, or the like). The predicted channel state may be predicted based on predictions of channel state factors which may impact the channel state of the communication channel (e.g., path loss, shadow fading, fast fading, or the like).

20 Claims, 5 Drawing Sheets

US 10,263,682 B2

CHANNEL STATE PREDICTION BASED ON PREDICTION OF CHANNEL STATE FACTORS

TECHNICAL FIELD

The present disclosure relates generally to communication systems and, more particularly but not exclusively, to predicting channel state in communication systems.

BACKGROUND

Various types of communication systems, including air interface communication systems, include transmitters configured to use feedback of receiver channel state information (CSI) of receivers to optimize transmissions to the receivers. Disadvantageously, however, in high latency communication systems (e.g., satellite communication systems), the receiver CSI becomes stale over time such that the utility of the receiver CSI is compromised and, thus, performance of the receiver may suffer.

SUMMARY

The present disclosure generally discloses a channel state prediction capability for predicting channel state in a communication system.

In at least some embodiments, an apparatus is provided. The apparatus includes a processor and a memory communicatively connected to the processor. The processor is configured to determine a measured channel quality for a wireless channel between a transmitter and a receiver, determine a total round trip latency associated with the wireless channel, and determine a predicted channel quality for the wireless channel based on the measured channel quality for the wireless channel and the total round trip latency associated with the wireless channel.

In at least some embodiments, a non-transitory computer-readable storage medium is provided. The non-transitory computer-readable storage medium stores instructions which, when executed by a computer, cause the computer to perform a method. The method includes determining a measured channel quality for a wireless channel between a transmitter and the receiver, determining a total round trip latency associated with the wireless channel, and determining a predicted channel quality for the wireless channel based on the measured channel quality for the wireless channel and the total round trip latency associated with the wireless channel.

In at least some embodiments, a method is provided. The method includes determining a measured channel quality for a wireless channel between a transmitter and the receiver, determining a total round trip latency associated with the wireless channel, and determining a predicted channel quality for the wireless channel based on the measured channel quality for the wireless channel and the total round trip latency associated with the wireless channel.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
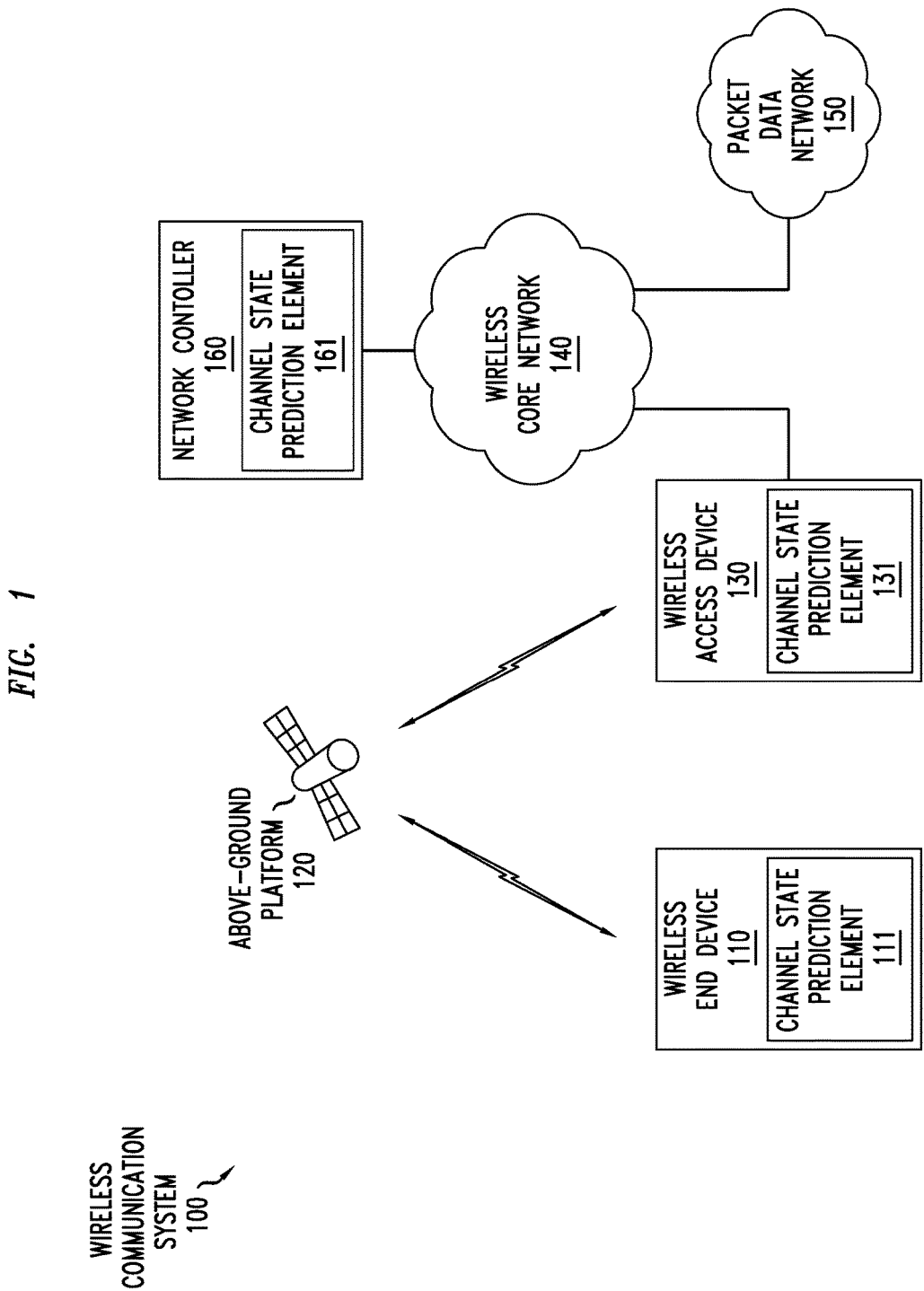
FIG. 1 depicts a wireless communication system supporting use of channel state prediction to improve communications.

The present disclosure generally discloses a channel state prediction capability configured to improve communications between a transmitter and a receiver in a communication network.

In many types of communication systems, given a transmitter and an associated receiver where the transmitter transmits to the receiver via a communication channel, the transmitter may rely on accurate and timely feedback by the receiver of channel state information for the communication channel in order to improve or optimize transmissions from the transmitter to the receiver. For example, such channel state information may be used in many types of wireless communication systems, such as Fifth Generation (5G) wireless systems, Fourth Generation (4G) wireless systems (e.g., Long Term Evolution (LTE) wireless systems), Third Generation (3G) wireless systems (e.g., Universal Mobile for Telecommunications System (UMTS) networks, Code Division Multiple Access (CDMA) networks, or the like), WiFi systems, or the like. The freshness or staleness, and, thus, accuracy and timeliness, of the channel state information depends on the total round trip latency (TRTL) of the communication channel between the transmitter and the receiver. The TRTL of the communication channel may include a round trip latency (RTL) between the transmitter and the receiver, plus additional processing time including processing time at the receiver and processing time at the transmitter. The RTL between the transmitter and the receiver includes the time elapsed between when the channel state information is measured at the receiver and when the receiver receives a data transmission from the transmitter that is based on that channel state information, which includes the time for the channel state information to be provided from the receiver to the transmitter, the time for the transmitter to use the channel state information to perform the data transmission to the receiver, and the time for the receiver to receive the data transmission from the transmitter. It is noted that, in relatively high latency communication systems (e.g., communications via satellites, communications over large terrestrial cells, or the like), the channel state information typically becomes stale in a time varying channel due to the high latency associated with reporting and use of the channel state information. Thus, in relatively high latency communication systems, the utility of the channel state information may be significantly compromised and, thus, performance of the transmitter and the receiver may suffer.

In at least some embodiments, in a communication system including a transmitter and a receiver communicating via a communication channel, the channel state prediction capability may be used to improve communications between the transmitter and the receiver by enabling the transmitter to determine a predicted channel state of the communication channel between the transmitter and the receiver and enabling the transmitter to transmit to the receiver via the communication channel based on the predicted channel state of the communication channel between the transmitter and the receiver. The predicted channel state may be a prediction of the channel state at a future time at which data transmitted by the transmitter is expected to be received by the receiver. This future time is based on the TRTL of the communication channel between the transmitter and the receiver. The predicted channel state may include one or more predicted channel state parameters (e.g., a predicted channel quality indicator (CQI) parameter, a predicted rank indicator (RI) parameter, a predicted pre-coding matrix index (PMI) parameter, or like channel state parameters, as well as various combinations thereof). The predicted channel state may be predicted based on predictions of channel state factors which may impact the channel state of the communication channel between the transmitter and the receiver (e.g., path loss (PL), shadow fading (SF), fast fading (FF), or the like, as well as various combinations thereof. The predicted channel state may be predicted based on predictions of one or more channel state factors, at a future time, based on the TRTL between the transmitter and the receiver. The predicted channel state may be used by the transmitter to improve or optimize a transmission from the transmitter to the receiver (e.g., used to select transmission parameters, such as a transmitter transport format, to be used by the transmitter to transmit to the receiver at the future time which, for the transmitter, may include information adapted to inform the transmitter as where and how the data is to be transmitted to the receiver via the communication channel, such as one or more of a modulation and coding scheme (MSC), an antenna mode (e.g., multi-input/multi-output (MIMO) antenna mode), resource locations for transmission of the data, a hybrid automatic repeat request (ARQ) redundancy version, or the like, as well as various combinations thereof). The predicted channel state may also be used by the receiver to improve or optimize a reception by the receiver from the transmitter (e.g., used to select, reception parameters, such as a receiver transport format, to be used by the receiver to receive from the transmitter at the future time which, for the receiver, may include information adapted to inform the receiver as to where and how the data is to be received from the transmitter via the communication channel, such as one or more of an MSC, an antenna mode (e.g., MIMO antenna mode), resource locations for reception of the data, a hybrid ARQ redundancy version, or the like, as well as various combinations thereof). It will be appreciated that, while various embodiments of the channel state prediction capability may be particularly well-suited for use in communication networks having relatively high communication latency (e.g., wireless communication systems and, more specifically, satellite-based communication systems) and, thus, are primarily presented herein within the context of such communication networks having relatively high communication latency, various embodiments of the channel state prediction capability may be used in various other types of communication systems. These and various other embodiments and advantages or potential advantages of the channel state prediction capability may be further understood by way of reference to the wireless communication system of FIG. 1.

FIG. 1 depicts a wireless communication system supporting use of channel state prediction to improve communications.

The wireless communication system 100 is a satellite-based communication system in which the wireless path is multi-hop link including a satellite.

The wireless communication system 100 includes a wireless end device (WED) 110, an above ground platform (AGP) 120, a wireless access device (WAD) 130, a wireless core network (WCN) 140, a packet data network (PDN) 150, and a network controller (NC) 160. The wireless link between the WED 110 and the WAD 130 is a two-hop link including a first wireless link between the WED 110 and the AGP 120 and a second wireless link between the AGP 120 and the WAD 130. The WAD 130 is connected to the WCN 140. The WCN 140 is connected to the PDN 150. The NC 160 is communicatively connected to the WCN 140 and, thus, may communicate with any of the elements of wireless communication system 100 (e.g., WAD 130, AGP 120, WED 110, or the like).

The WED 110 is a wireless end device configured to communicate via the wireless link 170. The WED 110 may be a mobile wireless end device or a fixed wireless end device. The WED 110 may be a wireless end user device (e.g., a cellular phone, a smartphone, a tablet computer, a laptop computer, or the like), a wireless network device (e.g., a wireless access point, a wireless router, or the like), an automated device (e.g., a machine-type communication (MTC) device, an Internet-of-Things (IoT) device, or the like), or the like.

The AGP 120 is configured to operate as a wireless relay point between the WED 110 and the WAD 130. The AGP 120 may be a satellite, an aircraft (e.g., a plane, a drone, or the like) including a wireless relay device, a dirigible including a wireless relay device, or the like. The AGP 120 may have one or more independent serving areas (e.g., spot beams) in its RF illuminated footprint. The AGP 120 is configured to extend the range of WAD 130, enabling wireless service to be provided to wireless end devices that otherwise would be out of range of the WAD 130. It will be appreciated that AGP 120 may include various other types of above ground platforms.

The WAD 130 is configured to operate as a wireless point of access for wireless end devices such as the WED 110. The WAD 130 may be a cellular access device (e.g., a macro cell, a micro cell, a femto cell, a pico cell, or the like), a WiFi wireless access point (WAP), or the like. For example, the WAD 130 may be a NodeB (e.g., in UMTS), an evolved NodeB (eNodeB) (e.g., in LTE), a 5G BS, or the like. It will be appreciated that WAD 130 may include various other elements, may be configured to provide various other functions, or the like, as well as various combinations thereof.

The WCN 140 is configured to support wireless core network functions in support of wireless communications by wireless end devices, such as WED 110, via the WAD 130. The configuration of WCN 140 may depend on the type of wireless technology being used. For example, in the case of UMTS, the WCN 140 may include a Serving General Packet Radio Service (GPRS) Support Node (SGSN), a Gateway GPRS Support Node (GGSN), and other associated devices and functions. For example, in the case of LTE, the WCN 140 may include a Serving Gateway (SGW), Packet Data Network (PDN) Gateway (PGW), a Mobility Management Entity (MME), and other associated devices and functions. It will be appreciated that WCN 140 may include various other elements, may be configured to provide various other functions, or the like, as well as various combinations thereof.

The PDN 150 is a packet data network which may include various devices with which the WED 110 may communicate, which may support communications between WED 110 and various devices with which the WED 110 may communicate, or the like, as well as various combinations thereof. For example, the PDN 150 may be a public data network (e.g., the Internet), a private data network (e.g., an enterprise network, a private cloud network, a content network, or the like), or the like, as well as various combinations thereof.

The NC 160 is configured to provide various network control functions for wireless communication system 100. The NC 160 may have access to various types of data related to the operation of the wireless communication system 100, such as configuration data indicative of the configurations of elements of wireless communication system 100 (e.g., WED 110, AGP 120, WAD 130, or the like), location data (e.g., precise location data, average location data, trajectory data, speed data, motion data, or the like, as well as various combinations thereof) for elements of wireless communication system 100 (e.g., WED 110, AGP 120, WAD 130, or the like), or the like, as well as various combinations thereof.

The WED 110, WAD 130, and NC 160 each may be configured to perform various functions for supporting embodiments of the channel state prediction capability. This is represented in FIG. 1 via the channel state prediction element 111 of WED 110 (which may be configured to perform various channel state prediction functions presented herein as being performed by WED 110), the channel state prediction element 131 of the WAD 130 (which may be configured to perform various channel state prediction functions presented herein as being performed by WAD 130), and the channel state prediction element 161 of the NC 160 (which may be configured to perform various channel state prediction functions presented herein as being performed by NC 160). For example, the WED 110, the WAD 130, and the NC 160 may cooperate to determine the predicted channel state of a communication channel between the WED 110 and the WAD 130, which may be a downlink (DL) channel from the WAD 130 to the WED 110 or an uplink (UL) channel from the WED 110 to the WAD 130. For example, the NC 160, for a channel between the WAD 130 to the WED 110, may determine the predicted channel state of the channel and (1) determine the transmission parameter(s) to be used for transmitting over the channel (e.g., transmitter transport format for the transmitter or the like), and provide an indication of the transmission parameter(s) to the transmitter of the channel (e.g., to the WAD 130 for use by the WAD 130 to transmit to the WED 110 when the channel is a DL channel or to the WED 110 for use by the WED 110 to transmit to the WAD 130 when the channel is a UL channel) and (2) determine the reception parameter(s) to be used for receiving over the channel (e.g., receiver transport format for the receiver or the like), and provide an indication of the reception parameter(s) to the receiver of the channel (e.g., to the WED 110 for use by the WED 110 to receive from the WAD 130 when the channel is a DL channel or to the WAD 130 for use by the WAD 130 to receive from the WED 110 when the channel is a UL channel). For example, the NC 160, for a channel between the WAD 130 and the WED 110, may determine the predicted channel state of the channel and (1) provide an indication of the predicted channel state of the channel to the transmitter of the channel (e.g., to the WAD 130 when the channel is a DL channel or to the WED 110 when the channel is a UL channel) and the transmitter may use the predicted channel state of the channel to determine the transmission parameter(s) to be used for transmitting over the channel (e.g., transport format for the transmitter or the like) and then transmit over the channel based on the transmission parameter(s) and (2) provide an indication of the predicted channel state of the channel to the receiver of the channel (e.g., to the WED 110 when the channel is a DL channel or to the WAD 130 when the channel is a UL channel) and the receiver may use the predicted channel state of the channel to determine the reception parameter(s) to be used for receiving over the channel (e.g., transport format for the receiver or the like) and then receive over the channel based on the reception parameter(s). For example, the WAD 130, for a DL channel from the WAD 130 to the WED 110, may be configured to determine the predicted channel state of the DL channel, determine the transmission parameter(s) to be used by the WAD 130 for transmitting over the DL channel (e.g., transport format for transmission or the like) based on the predicted channel state of the DL channel, determine the reception parameter(s) to be used by the WED 110 for receiving over the DL channel (e.g., transport format for reception or the like) based on the predicted channel state of the DL channel, provide an indication of the reception parameter(s) to the WED 110 for use by the WED 110 in receiving the transmission from the WAD 130 over the DL channel, and transmit to the WED 110 over the DL channel based on the transmission parameter(s). For example, the WAD 130, for a UL channel from the WED 110 to the WAD 130, may be configured to determine the predicted channel state of the UL channel, determine the transmission parameter(s) to be used by the WED 110 for transmitting over the UL channel (e.g., transport format for transmission or the like) based on the predicted channel state of the UL channel, provide an indication of the transmission parameter(s) to the WED 110 for use by the WED 110 in transmitting to the WAD 130 over the UL channel, determine the reception parameter(s) to be used by the WAD 130 for receiving over the UL channel (e.g., transport format for reception or the like) based on the predicted channel state of the UL channel, and receive the transmission from the WED 110 over the UL channel based on the reception parameter(s). For example, the WAD 130, for a UL channel from the WED 110 to the WAD 130, may be configured to determine the predicted channel state of the UL channel, provide an indication of the predicted channel state of the UL channel to the WED 110 for use by the WED 110 to determine the transmission parameter(s) to be used for transmitting over the channel (e.g., transport format for transmission or the like), determine the reception parameter(s) to be used by the WAD 130 for receiving over the UL channel (e.g., transport format for reception or the like) based on the predicted channel state of the UL channel, and receive the transmission from the WED 110 over the UL channel based on the reception parameter(s). For example, the WED 110 may be configured to perform various functions primarily described above as being performed by the WAD 130 and/or the NC 160 (e.g., determine the predicted channel state of a DL channel or a UL channel, provide indications of the predicted channel state of a DL channel or a UL channel to the WAD 130, determine transmission parameter(s) to be used for transmitting over a DL channel or UL channel and/or reception parameters to be used for receiving over a DL channel or a UL channel, provide indications of the transmission parameter(s) to be used for transmitting over a DL channel to the WAD 130 or provide indications of the reception parameter(s) to be used for receiving over an UL channel to the WAD 130, receive over a DL channel based on the reception parameter(s) or transmit over a UL channel based on the transmission parameter(s), or the like, as well as various combinations thereof). It will be appreciated that the various functions discussed above may be centralized or distributed in other ways. These and various other functions related to supporting embodiments of the channel state prediction capability are discussed further below.

As noted above, the WED 110, the WAD 130, and the NC 160 may cooperate to determine the predicted channel state of a communication channel between the WED 110 and the WAD 130 (e.g., a DL channel from the WAD 130 to the WED 110 or a UL channel from the WED 110 to the WAD 130).

In general, the channel state of a communication channel (and, thus, the channel state that is measured at the receiver) may be affected by the following three channel state factors: (1) path loss (PL), (2) slow or shadow fading, and (3) fast fading. In many cases, PL may change in a predictable way and, thus, may be predicted; whereas, by contrast, slow and fast fading are generally random behavior (e.g., based on mobility of the wireless end device, local obstructions, or the like) and, thus, generally are not subject to predictions. It is noted, however, that there are exceptions, since slow and shadow fading may be predicted where highly accurate wireless end device location information and detailed three-dimensional maps are available. It will be appreciated that PL may include the effects of amplification or attenuation which may occur due to various elements (e.g., antennas (e.g., due to relative antenna orientation, relative antenna orientation beam gain effects, or the like), RF circuitry, or the like) along the path between the transmitter and the receiver (e.g., at the transmitter, at the receiver, or at any intermediate point between the transmitter and the receiver). It will be appreciated that various aspect of how these three channel state factors affect channel state may vary under various conditions.

In general, the channel state of a communication channel (and, thus, the channel state that is measured at the receiver) may be represented using channel state information (CSI). The CSI for a communication channel may include various parameters, where the parameters that are used may depend on various factors (e.g., the underlying wireless technology being used and so forth). For LTE, for example, CSI is composed of a CQI parameter, an RI parameter, a PMI parameter, and so forth. With respect to these specific parameters, it is noted each of these parameters could be related to PL and, thus, could be predicted based on predicted PL information. However, since RI and PMI are used for MIMO transmission, the discussion herein is focused on prediction of CQI information based on predicted PL information, but RI and PMI may also be predicted. It will be appreciated that CSI may be composed of other combinations of parameters for other types of wireless communication networks.

Accordingly, it will be appreciated that, while, for purpose of clarity, embodiments of the channel state prediction capability are primarily presented herein within the context of predicting a particular type of channel state information (namely, CQI) based on predictions of a particular type of channel state factor (namely, PL), various embodiments of the channel state prediction capability may be used to predict various types of channel state information (e.g., one or more of CQI, RI, PMI, or the like) based on various types of channel state factors (e.g., one or more of PL, slow fading, fast fading, or the like). As noted above, embodiments of the channel state prediction capability are primarily presented herein within the context of predicting a particular type of channel state information (namely, CQI) based on prediction of a particular type of channel state factor (namely, PL) and, thus, a detailed description of such embodiments follows.

The prediction of CQI at the receiver based on predictions of PL may be performed as follows. The manner in which the predicted CQI at the receiver is computed based on predicted PL may be further understood by first considering, more generally, the manner in which CQI may be computed. In general, CQI represents the SINR as observed by the receiver and CQI=SINR*$\chi$, where SINR is the predictable part of SINR, e.g., PL-dependent and $\chi$ is the unpredictable (e.g., non-PL-dependent) random variable (e.g., fast fading) associated with SINR (which also may be referred to as an unpredictable part of SINR). It will be appreciated that SINR=S/(N+I), where S is the signal power, N is the noise power (which is a known, fixed quantity), and I is the interference power. It will be appreciated that the signal power S may be computed as S=$T_s/PL_s$ and the interference power I may be computed as $$I = \sum_{i \in I}(T_i / PL_i)$$

where zero or more interfering transmitters may be present (i.e., I≥0). Thus, $$CQI = [S/(N+I)]^*\chi = \left[(T_s / PL_s) / \left(N + \sum_{i \in I}(T_i / PL_i)\right)\right]^*\chi,$$

where $T_s$ is the transmit power of the transmitter, $PL_s$ is the effective PL for the transmitter accounting for the total PL from the transmitter to the receiver, $T_i$ is the transmit power of interfering transmitter i, and $PL_i$ is the effective PL for the interfering transmitter i accounting for the total PL from the interfering transmitter i to the receiver.

The predicted CQI at the receiver is a prediction of the CQI at the receiver at a future time that is after an initial time that is associated with measurement of the initial CQI at the receiver, where future time=TRTL+initial time. The predicted CQI at the receiver at the future time, as discussed further below, may be computed by (1) using the initial CQI measured by the receiver at the initial time and information associated with measurement of the initial CQI by the receiver at the initial time to compute the value of the non-PL-dependent random variable $\chi$ and (2) using information associated with the CQI at the receiver at the future time (which may include information known based on TRTL and information predicted based on TRTL) and the non-PL-dependent random variable $\chi$ to compute the predicted CQI at the receiver at the future time. Here, the non-PL-dependent random variable $\chi$ that is computed for the initial time is reused for the prediction of the CQI at the receiver at the future time as the non-PL-dependent random variable $\chi$ is expected to be relatively constant over the TRTL between the initial time and the future time.

Figure 2:
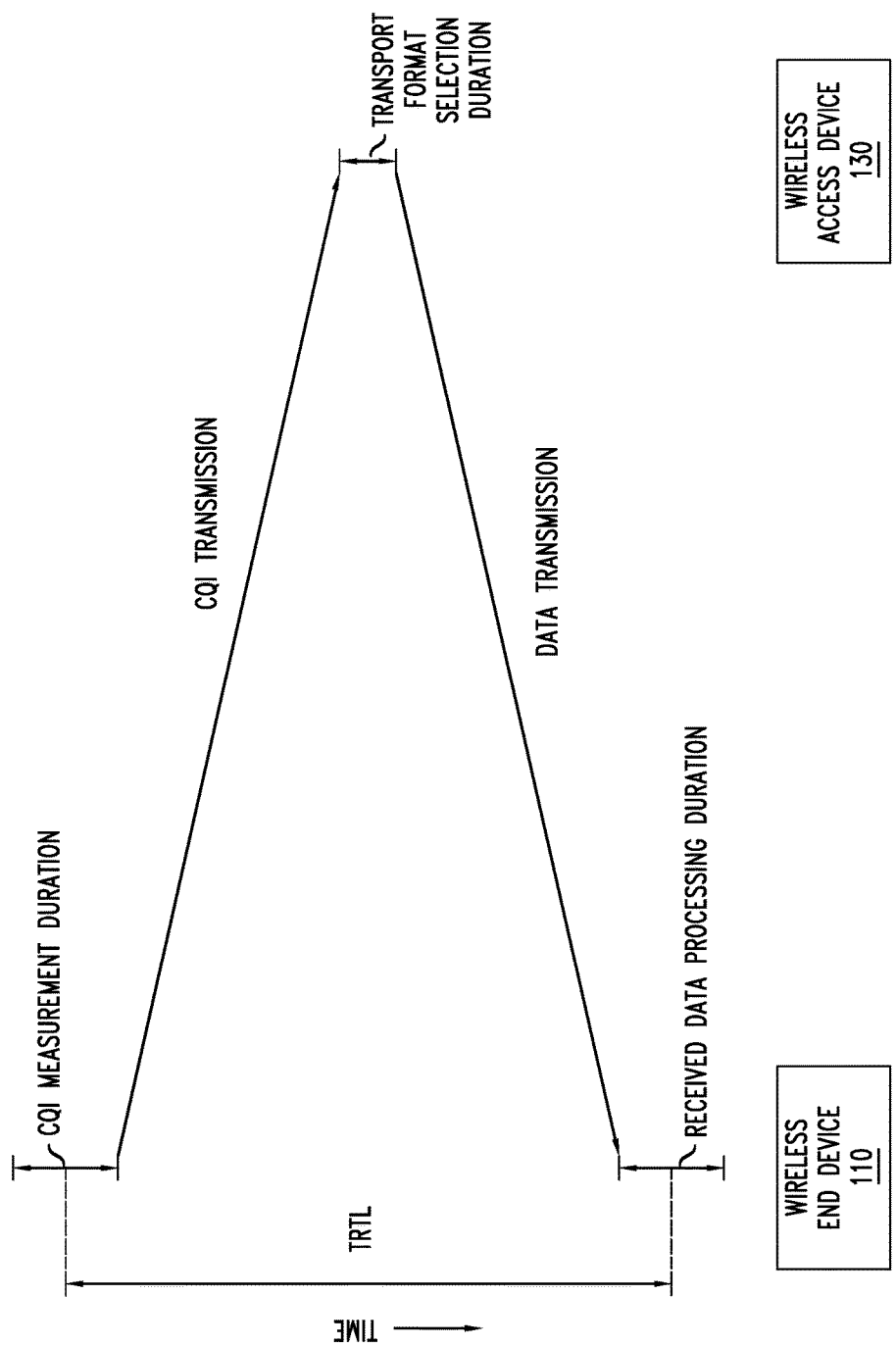
FIG. 2 depicts a total round trip latency for a downlink channel in the wireless communication system of FIG. 1.

As indicated above, the predicted CQI at the receiver at the future time is computed based on a TRTL associated with the communication channel between the transmitter-receiver pair (e.g., the WED 110 and the WAD 130). As discussed herein, the TRTL of the communication channel may include an RTL between the transmitter and the receiver, plus additional processing time that includes processing time at the receiver (e.g., CQI measurement duration and received data processing duration) and processing time at the transmitter (e.g., transport format selection duration during which the transmitters selects the transport format and transmits data toward the receiver based on the selected transport format). For example, for a DL channel from WAD 130 to the WED 110, the TRTL may be a WED-WAD-WED TRTL representing round trip time from the WED 110 to the WAD 130, as well as processing time on the WED 110 (e.g., for CQI measurement on the WED 110, where such processing time may include at least a portion of the CQI measurement duration on the WED 110), processing time on the WAD 130 (e.g., for transport format selection and data transmission), and processing time on the WED 110 (e.g., for processing the data received from the WAD 130, where such processing time may include at least a portion of the received data processing duration on the WED 110). An example of a DL TRTL is presented in FIG. 2 (which, as an example, depicts the TRTL as being a time from at or near a midpoint of the CQI measurement duration (e.g., a time at which the CQI measurement is obtained, which may be preceded by some processing for preparing to take the CQI measurement and which may be followed by some processing for preparing the CQI measurement for transmission to the WAD 130) to at or near a midpoint of the received data processing duration (e.g., a time at which the received data is processed based on the transport format, which may be preceded by some initial processing of the received data to prepare it for processing based on the transport format and which may be followed by some processing for handling the received data after it has been processed based on the transport format). It will be appreciated that the start time of the TRTL may or may not fall at or near the midpoint of the CQI measurement duration and, similarly, that the end time of the TRTL may or may not fall at or near the midpoint of the received data processing duration. It will be appreciated that the TRTL may be considered to be a duration between a time associated with measurement of the CQI and a time associated with processing of received data. Similarly, for example, for a UL channel from WED 110 to the WAD 130, the TRTL may be a WAD-WED-WAD TRTL representing round trip time from the WAD 130 to the WED 110, as well as processing time on the WAD 130 (e.g., CQI measurement or determination), processing time on the WED 110 (e.g., transport format selection and data transmission), and processing time on the WAD 130 (e.g., for processing the data received from the WED 110). The NC 160 may be configured to determine the TRTL for the transmitter-receiver pair. The NC 160 may be configured to determine the TRTL for a transmitter-receiver pair based on location and movement information associated with the transmitter and the receiver, processing capabilities of the transmitter and the receiver, location and movement information associated with any intermediate elements (e.g., orbital information of the AGP 120), or the like, as well as various combinations thereof. The TRTL for the transmitter-receiver pair may be a WED-specific TRTL that is specific to that WED 110 or a non-WED-specific TRTL (e.g., an average TRTL for a serving area in which the WED 110 is located). The NC 160 may determine a WED-specific TRTL that is specific to that WED 110 when the NC 160 has specific location information for the WED 110 (e.g., location information of the WED 110 that may be provided by the WAD 130). The NC 160 may determine a non-WED-specific TRTL for the WED 110 (e.g., based on an average for the serving area in which the WED 110 is located) when the NC 160 does not have specific location information for the WED 110. It will be appreciated that the TRTL for a transmitter-receiver pair may be determined in various other ways based on various other types of information.

As indicated above, the predicted CQI at the receiver at the future time is computed based on knowledge of geographical information related to the wireless communication system 100. The geographical information related to the wireless communication system 100 may be determined by or known to WAD 130 and other WADs which have been omitted for purposes of clarity, may be determined by or known to NC 160, or the like, as well as various combinations thereof. The geographical information related to the wireless communication system 100 may include geographic location information (e.g., absolute location information, relative location information, or the like), geographic movement information (e.g., speed information, trajectory information, or the like), or the like, as well as various combinations thereof. The geographical information related to the wireless communication system 100 may include geographic location information for WED 110 and other WEDs which have been omitted for purposes of clarity (e.g., which may be determined based on various geolocation techniques), geographic location information for WAD 130 and other WADs which have been omitted for purposes of clarity, geographic location information for AGP 120, or the like, as well as various combinations thereof. As discussed further below, the geographical information may be used for identification of interferers or potential interferers within wireless communication system 100 (e.g., WADs which are interferers or potential interferers to each other, WADs which are interferers or potential interferers to WEDs, or the like), determination of effective PL information, or the like, as well as various combinations thereof. The geographical information may be used in various other ways.

As indicated above, the predicted CQI at the receiver at the future time is computed based on a prediction of PL associated with the transmitter-receiver pair (e.g., the WED 110 and the WAD 130). The NC 160 has access to PL information for wireless communication system 100. The PL information for wireless communication system 100 may include effective PL information (e.g., a ratio of the transmitted RS power to the received RS power). The PL information for wireless communication system 100 may include specific PL information, such as bidirectional PL between locations served by wireless communication system 100 (e.g., PL between locations within the service area of AGP 120, PL between locations within the service area of AGP 120 and WAD 130 and other WADs which have been omitted for purposes of clarity, or the like), bidirectional PL between pairs of devices of (e.g., PL between WED 110 and other WEDs which have been omitted for purposes of clarity and AGP 120, PL between AGP 120 and WAD 130 and other WADs which have been omitted for purposes of clarity, PL between pairs of WADs, PL between WEDs and WADs, or the like), or the like, as well as various combinations thereof. The specific PL information may be based on known locations of specific devices (e.g., WED 110 and other WEDs which have been omitted for purposes of clarity, WAD 130 and other WADs which have been omitted for purposes of clarity, or the like). The PL information for wireless communication system 100 may include average PL information, such as an average PL between WAD 130 and other WADs which have been omitted for purposes of clarity and a serving area of AGP 120 or other types of average PL information based on other geographic areas that are larger than specific locations which may be specific to WEDs and WADs. The PL between WED 110 and WAD 130 (or any other WED-WAD pairs that communicate via AGP 120) may take into account any transmission distance related PL as well as any amplification at AGP 120. The PL information for wireless communication system 100 may include PL as a function of distance and antenna orientations at AGP 120. The NC 160 also has access to input information which may be used to determine PL information for wireless communication system 100 (e.g., location and movement information for WED 110 and other WEDs which have been omitted for purposes of clarity, location and movement information for WAD 130 and other WADs which have been omitted for purposes of clarity, location and movement information for AGP 120 (e.g., AGP 120 may be moving at a known velocity and trajectory), serving area information for AGP 120 as a function of time, or the like, as well as various combinations thereof) and may be configured to use such input information (e.g., based on analytic computing) to determine the PL information for wireless communication system 100. The NC 160 may obtain the PL information a priori (e.g., based on measurements and calibration), learned during service, or the like, as well as various combinations thereof (e.g., initial PL information is known to NC 160 a priori and is updated dynamically during service). The NC 160 also has access to TRTL information for transmitter-receiver pairs (e.g., the WED 110 and the WAD 130). The NC 160 may use the PL information and the TRTL in order to determine predicted PL information. For example, if the PL is changing to the WAD 130 (and other WADs which are omitted for purposes of clarity) in a predictable way, e.g., due to the known location and mobility of the WED 110 and the WAD 130, then the effect of PLs to different WADs may be predicted based on TRTL. As a result, for the transmitter-receiver pair (e.g., the WED 110 and the WAD 130), given the PL to each of the WADs that affect the CQI as a function of time, and given knowledge of the measured CQI received from the receiver and knowledge of the TRTL of the transmitter-receiver pair, the change in CQI from the time of measurement of the CQI by the receiver to the time of receipt of the data by the receiver can be predicted and, thus, the achieved CQI at the receiver at the time of receipt of the data by the receiver can be predicted. The transmitter of the transmitter-receiver pair may then use the prediction of the CQI at the receiver at the time of receipt of the data by the receiver to properly transmit that data to the receiver (e.g., based on selection of the transport format for the data transmission), thereby ensuring a proper match to the prevailing CQI and, thus, improving or even optimizing performance.

The prediction of CQI at the receiver based on predictions of PL may be performed as follows. The prediction of CQI may be a prediction of the CQI at the received at the future time at which data is expected to be received by the receiver, which is TRTL after the initial measurement of the initial CQI by the receiver. This prediction of CQI may be based on a prediction of the SINR value at the receiver at the future time, which may be determined as follows. As indicated above, CQI=SINR*$\chi$, where SINR is the predictable (e.g., PL-dependent) part of SINR and $\chi$ is the unpredictable (e.g., non-PL-dependent) random variable associated with SINR. It will be appreciated that SINR=S/(N+I), where S is the signal power which may be computed as S=$T_s$/$PL_s$, N is the noise power (which is a known, fixed quantity), and I is the interference power which be computed as $$I = \sum_{i \in I} (T_i / PL_i).$$

In at least some embodiments, the prediction of CQI at the receiver based on predictions of PL may be performed by computing a predicted signal power $S_{TRTL}$ at the future time (e.g., TRTL after the initial time of measurement of the CQI at the receiver) based on the predicted PL information (e.g., specific predicted PL information or average predicted PL information), identifying the interferers (or primary interferers), computing a predicted interference power $I_{TRTL}$ at the future time (e.g., TRTL after the initial time of measurement of the CQI at the receiver) based on the predicted PL information (e.g., specific predicted PL information or average predicted PL information) associated with the identified interferers, and computing the predicted CQI at the receiver at the future time based on the predicted signal power $S_{TRTL}$ and the predicted interference power $I_{TRTL}$.

The prediction of CQI at the receiver based on predictions of PL may be performed as follows.

As indicated above, the initial CQI measured by the receiver at the initial time and information associated with measurement of the initial CQI by the receiver at the initial time may be used to compute the value of the non-PL-dependent random variable $\chi$. The initial CQI that is measured by the receiver at the initial time (notated as "Init" herein), may be represented as follows:

$$CQI_{Init} = \left[ (T_{s\_Init} / PL_{s\_Init}) \Big/ \left( N + \sum_{i \in I} (T_{i\_Init} / PL_{i\_Init}) \right) \right] * \chi.$$

Here, all of the values, with the exception of the non-PL-dependent random variable x, may be determined (e.g., they may be measured, calculated, known, or the like, as well as various combinations thereof). For example, the $CQI_{Init}$ parameter is measured by the receiver of the channel (e.g., measured by the WED 110 and reported from the WED 110 to the WAD 130 for a DL channel from the WAD 130 to the WED 110 or measured by the WAD 130 for a UL channel from the WED 110 to the WAD 130). For example, the noise N is a fixed, known quantity that may be known to the WAD 130, the NC 160, or other elements. For example, for a DL channel from WAD 130 to the WED 110, the $T_{s\_Init}$ parameter is the transmit power of the WAD 130 at the initial time, which is a known system parameter that may be known to the WAD 130, NC 160, or other elements. For example, for a UL channel from WED 110 to the WAD 130, the $T_{s\_Init}$ parameter is the transmit power of the WED 110 at the initial time, which may be known to the WAD 130 (e.g., such as where the WAD 130 instructed the WED 110 as to the transmit power to use), may be determined by the WAD 130 based on processing of data received by the WAD 130 from the WED 110, or the like. For example, the set of interfering transmitters at the initial time may be known to the WAD 130, the NC 160, or other elements (where it will be appreciated that the interferers may be different for a DL channel from the WAD 130 to the WED 110 and a UL channel from the WED 110 to the WAD 130). For example, for a DL channel from WAD 130 to the WED 110, the $T_{i\_Init}$ parameter is the transmit power of the interfering transmitter i (e.g., another WAD (omitted for purposes of clarity) which may be located near WAD 130, another serving area or beam that may cause interference, or the like) at the initial time, which is a known system parameter that may be known to the WAD 130, NC 160, or other elements. For example, for a UL channel from WED 110 to the WAD 130, the $T_{i\_Init}$ parameter is the transmit power of the interfering transmitter i (e.g., another WED or WAD or a serving area or beam, omitted for purposes of clarity, which may be located near WED 110) at the initial time, which is a known system parameter that may be known to the WED 110, the WAD 130, the NC 160, or other elements. For example, the $PL_{s\_Init}$ parameter is the PL between the WAD 130 and the WED 110 at the initial time (e.g., the PL from the WAD 130 to the WED 110 for a DL channel from the WAD 130 to the WED 110 or the PL from the WED 110 to the WAD 130 for a UL channel from the WED 110 to the WAD 130), which is known by or may be determined by the NC 160 (and, thus, also may be made known to the WAD 130, the WED 110, or other elements). For example, the $PL_{i\_Init}$ parameter is the PL from the interfering transmitter to the receiver at the initial time (e.g., the PL from the interfering transmitter to the WED 110 for a DL channel from the WAD 130 to the WED 110 or the PL from the interfering transmitter to the WAD 130 for a UL channel from the WED 110 to the WAD 130), which is known by or may be determined by the NC 160 (and, thus, also may be made known to the WAD 130, the WED 110, or other elements). It will be appreciated that, given support for communications between the various devices (namely, the WED 110, the WAD 130, and the NC 160), the values of any of these parameters may be obtained by any of the devices (e.g., whether already known or computed there or received in a message from another of the devices) and, thus, the value of the non-PL-dependent random variable $\chi$ at the initial time may be computed at any suitable location within the wireless communication system 100. As noted above, the value of non-PL-dependent random variable $\chi$ may be computed based on the values of the other parameters.

As indicated above, information associated with the CQI at the receiver at the future time (which may include information known based on TRTL and information predicted based on TRTL) and the non-PL-dependent random variable $\chi$ may be used to compute the predicted CQI at the receiver at the future time. The predicted CQI at the receiver at the future time (notated as "TRTL" herein since it is TRTL after the initial time), may be represented as follows:

$$CQI_{TRTL} = \left[ (T_{s\_TRTL} / PL_{s\_TRTL}) / \left( N + \sum_{i \in I} (T_{i\_TRTL} / PL_{i\_TRTL}) \right) \right] * \chi.$$

Here, all of the values, with the exception of the predicted CQI at the receiver ($CQI_{TRTL}$), may be determined (e.g., they may be measured, calculated, known, or the like, as well as various combinations thereof). For example, the noise N is a fixed, known quantity that may be known to the WAD 130, the NC 160, or other elements. For example, for a DL channel from WAD 130 to the WED 110, the $T_{s\_TRTL}$ parameter is the transmit power of the WAD 130 at the future time, which is a known system parameter that may be known to the WAD 130, NC 160, or other elements. For example, for a UL channel from WED 110 to the WAD 130, the $T_{s\_TRTL}$ parameter is the transmit power of the WED 110 at the future time, which may be known to the WAD 130 (e.g., such as where the WAD 130 instructed the WED 110 as to the transmit power to use), may be known to the WAD 130, or the like. For example, the set of interfering transmitters at the future time (where it will be appreciated that the interferers may be different for a DL channel from the WAD 130 to the WED 110 and a UL channel from the WED 110 to the WAD 130) may be (1) known to the WAD 130, the NC 160, or other elements (e.g., where the locations of the receivers and interferers relative to each other will not change or at least will not change significantly or where the way in which they will change is known) or (2) predicted by the WAD 130, the NC 160, or other elements (e.g., based on various types of location data where the locations of the receivers and interferers relative to each will or may change between the initial time and the future time). For example, for a DL channel from WAD 130 to the WED 110, the $T_{i\_TRTL}$ parameter is the transmit power of the interfering transmitter i (e.g., another WAD, omitted for purposes of clarity, which may be located near WAD 130) at the future time, which may be (1) a known system parameter that may be known to the WAD 130, NC 160, or other elements or (2) predicted by the WAD 130, NC 160, or other elements. For example, for a UL channel from WED 110 to the WAD 130, the $T_{i\_TRTL}$ parameter is the transmit power of the interfering transmitter i (e.g., another WED or WAD, omitted for purposes of clarity, which may be located near WED 110) at the initial time, which may be (1) a known system parameter that may be known to the WED 110, the WAD 130, the NC 160, or other elements or (2) predicted by the WAD 130, NC 160, or other elements. For example, the $PL_{s\_TRTL}$ parameter is the predicted PL between the WAD 130 and the WED 110 at the future time (e.g., the predicted PL from the WAD 130 to the WED 110 for a DL channel from the WAD 130 to the WED 110 or the predicted PL from the WED 110 to the WAD 130 for a UL channel from the WED 110 to the WAD 130), which may be predicted by WAD 130 and/or NC 160. For example, the $PL_{i\_TRTL}$ parameter is the predicted PL from the interfering transmitter to the receiver at the future time (e.g., the predicted PL from the interfering transmitter to the WED 110 for a DL channel from the WAD 130 to the WED 110 or the predicted PL from the interfering transmitter to the WAD 130 for a UL channel from the WED 110 to the WAD 130), which may be predicted by WAD 130 and/or NC 160. It will be appreciated that, given support for communications between the various devices (namely, the WED 110, the WAD 130, and the NC 160), the values of any of these parameters may be obtained by any of the devices (e.g., whether already known or computed or predicted there or received in a message from another of the devices) and, thus, the predicted CQI at the receiver at the future time may be computed at any suitable location within the wireless communication system 100. As noted above, the value of the predicted CQI at the receiver at the future time of data reception at the receiver may be computed based on the values of the other parameters.

As noted above, it will be appreciated that, while, for purpose of clarity, embodiments of the channel state prediction capability are primarily presented herein within the context of predicting a particular type of channel state information (namely, CQI) based on predictions of a particular type of channel state factor (namely, PL), various embodiments of the channel state prediction capability may be used to predict various types of channel state information (e.g., one or more of CQI, RI, PMI, or the like) based on various types of channel state factors (e.g., one or more of PL, slow fading, fast fading, or the like). It also will be appreciated that, under various conditions, certain portions of the SINR may be predictable (e.g., primarily presented herein as being the PL-dependent part of the SINR, although it also or alternatively may include the slow fading and/or fast fading parts of the SINR) and certain portions of the SINR may be unpredictable (e.g., primarily presented herein as being the slow fading and the fast fading parts of the SINR, although it also or alternatively may include the PL-dependent of the SINR) and, thus, that the more general terms "predicable part of SINR" and "unpredictable part of SINR" may be used.

Figure 3:
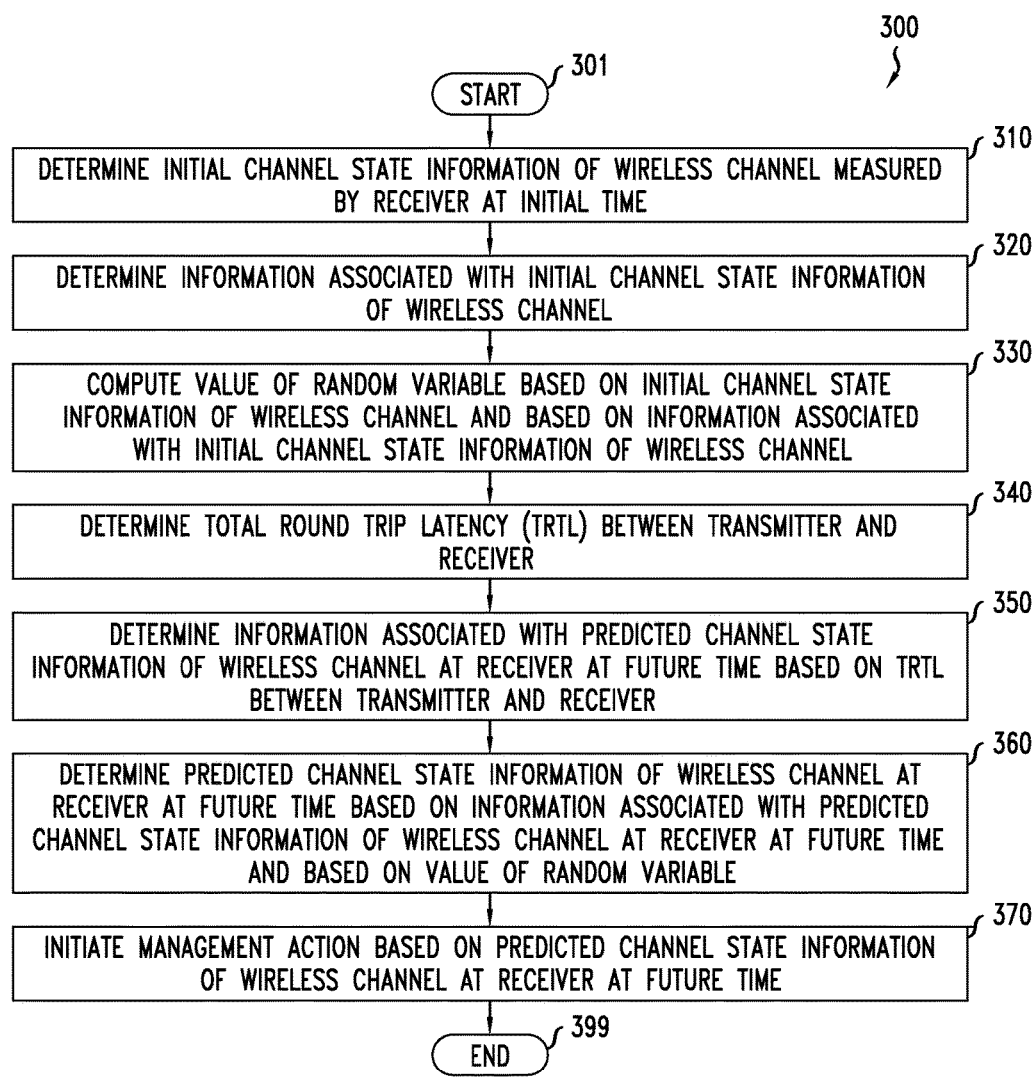
FIG. 3 depicts a method of predicting channel state of a wireless channel between a transmitter and a receiver based on total round trip latency.

FIG. 3 depicts a method of predicting channel state of a wireless channel between a transmitter and a receiver based on total round trip latency. It will be appreciated that, although primarily presented as being performed serially, at least a portion of the functions of method 300 may be performed contemporaneously or in a different order than as presented in FIG. 3.

At block 301, method 300 begins.

At block 310, initial channel state information of the wireless channel measured by the receiver at an initial time is determined. The initial channel state information of the wireless channel at the initial time may include an initial CQI, an initial RI, an initial PMI, or the like, as well as various combinations thereof. The initial channel state information of the wireless channel may be determined by a local measurement (e.g., where method 300 is executed at the receiver), by receiving initial channel state information from another device (e.g., where the method 300 is executed at the transmitter or another device), or the like.

At block 320, information associated with the initial channel state information of the wireless channel is determined. The information associated with the initial channel state information of the wireless channel may vary depending on the type of channel state information in the initial channel state information.

At block 330, a value of a random variable is computed based on the initial channel state information of the wireless channel and based on the information associated with the initial channel state information of the wireless channel. The information that is represented by the random variable may vary depending on the type of channel state information in the initial channel state information. For example, where the initial channel state information of the wireless channel includes an initial CQI that represents the initial SINR as observed by the receiver and CQI=SINR*$\chi$, SINR will be understood to include the PL-dependent (or, more generally, predictable) part of SINR and $\chi$ will be understood to be the non-PL-dependent (or, more generally, unpredictable) part of SINR (e.g., representing the effects of fast fading). It is noted that other types of random variables may be used where the initial channel state information of the wireless channel includes other paramereter (e.g., RI, PMI, or the like).

At block 340, total round trip latency (TRTL) between the transmitter and the receiver is determined.

At block 350, information associated with predicted channel state information of the wireless channel at the receiver at a future time is determined based on the TRTL between the transmitter and the receiver. The information associated with predicted channel state information of the wireless channel at the receiver at the future time may include information known based on TRTL and information predicted based on TRTL.

At block 360, the predicted channel state information of the wireless channel at the receiver at the future time is determined based on the information associated with predicted channel state information of the wireless channel at the receiver at the future time and based on the value of the random variable. The predicted channel state information of the wireless channel at the future time may include a predicted CQI, a predicted RI, a predicted PMI, or the like, as well as various combinations thereof.

At block 370, a management action is initiated based on the predicted channel state information of the wireless channel at the future time. The management action that is initiated may depend on which device executes method 300 of FIG. 3. The management action may include one or more of propagating an indication of the predicted channel state information of the wireless channel at the future time, selecting a transport format based on the predicted channel state information of the wireless channel at the receiver at the future time, propagating an indication of a transport format selected based on the predicted channel state information of the wireless channel at the receiver at the future time (e.g., sending an indication of the transport format to be used by the transmitter from a controller to the transmitter where the controller determines the transport format to be used by the transmitter, sending an indication of the transport format to be used by the receiver from the transmitter to the receiver where the transmitter determines the transport format to be used by the receiver, or the like), transmitting data based on a transport format selected based on the predicted channel state information of the wireless channel at the receiver at the future time, or the like, as well as various combinations thereof.

At block 399, method 300 ends.

Figure 4:
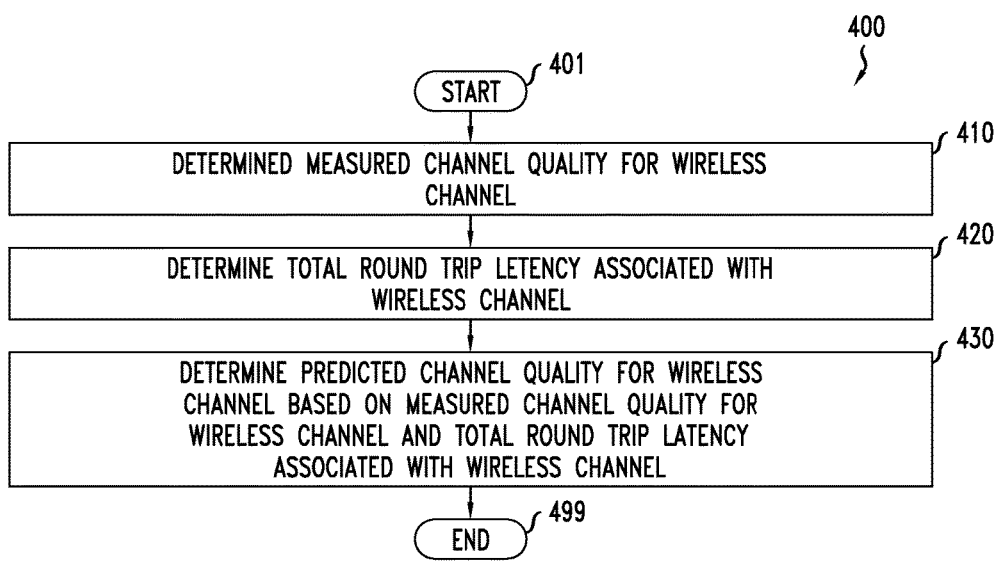
FIG. 4 depicts a method of predicting channel state of a wireless channel between a transmitter and a receiver based on total round trip latency.

FIG. 4 depicts a method of predicting channel state of a wireless channel between a transmitter and a receiver based on total round trip latency. It will be appreciated that, although primarily presented as being performed serially, at least a portion of the functions of method 400 may be performed contemporaneously or in a different order than as presented in FIG. 4. At block 401, method 400 begins. At block 410, a measured channel quality for the wireless channel is determined. At block 420, a total round trip latency associated with the wireless channel is determined. At block 430, a predicted channel quality for the wireless channel is determined based on the measured channel quality for the wireless channel and the total round trip latency associated with the wireless channel. At block 499, method 400 ends.

It will be appreciated that, although primarily presented herein within the context of using embodiments of the channel state prediction capability in particular types of communications systems (namely, wireless communication systems having relatively high communication latency, such as in satellite-based communication systems), embodiments of the channel state prediction capability may be used in various other types of communication systems, such as other types of wireless communication systems (e.g., cellular wireless systems such as Fourth Generation (4G) and Fifth Generation (5G) systems), wired communication systems, or the like.

Various embodiments of the channel state prediction capability may provide various other advantages or potential advantages. Various embodiments of the channel state prediction capability may prevent the utility of the channel state information from being compromised in a communication system, in a relatively high latency communication system in which the utility of the channel state information typically would be compromised due to the associated latency, and, thus, may improve or even optimize performance within the communication system (e.g., transmitter performance, receiver performance, or the like, as well as various combinations thereof). Various embodiments of the channel state prediction capability may provide various other advantages or potential advantages.

Figure 5:
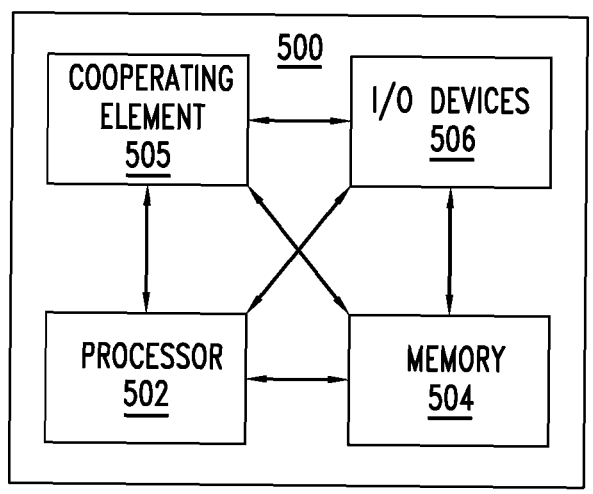
FIG. 5 depicts a high-level block diagram of a computer suitable for use in performing various functions described herein.

FIG. 5 depicts a high-level block diagram of a computer suitable for use in performing various functions presented herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing all or part of one or more of a WED 110, an AGP 120, a WAD 130, an NC 160, or the like.

It will be appreciated that at least some of the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
   determine a measured channel quality for a wireless channel between a transmitter and a receiver;
   determine a total round trip latency associated with the wireless channel;
   determine, based on the total round trip latency, a predicted signal-to-interference-and-noise (SINR) ratio for the wireless channel; and
   determine, based on the measured channel quality and the predicted SINR ratio, a predicted channel quality for the wireless channel.

2. The apparatus of claim 1, wherein the measured channel quality and the predicted channel quality are specified using at least one of a channel quality indicator (CQI) parameter, a rank indicator (RI) parameter, or a pre-coding matrix index (PMI) parameter.

3. The apparatus of claim 1, wherein the measured channel quality and the predicted channel quality are based on at least one of path loss, shadow fading, or fast fading.

4. The apparatus of claim 3, wherein the path loss accounts for signal strength or interference strength amplification or attenuation due to electronic circuits or antennas between and including the transmitter and the receiver.

5. The apparatus of claim 1, wherein the measured channel quality comprises a channel quality measurement made by the receiver.

6. The apparatus of claim 1, wherein the total round trip latency associated with the wireless channel comprises a total round trip latency specific to the wireless channel.

7. The apparatus of claim 1, wherein the total round trip latency associated with the wireless channel comprises an average total round trip latency associated with a location with which the wireless channel is associated.

8. The apparatus of claim 1, wherein, to determine the predicted channel quality, the at least one memory and the computer program code are configured to, with the at least one processor, cause the apparatus to at least:
   determine, based on information associated with the measured channel quality, an initial SINR ratio for the wireless channel; and
   determine, based on the measured channel quality and the initial SINR ratio, a value of a variable associated with a quality of the wireless channel;
   wherein the determination of the predicted channel quality is further based on the value of the variable associated with the quality of the wireless channel.

9. The apparatus of claim 8, wherein the information associated with the measured channel quality comprises:
   a transmit power of the transmitter at an initial time at which the measured channel quality is measured;
   a path loss from the transmitter to the receiver at the initial time; and
   for each of one or more interfering transmitters, a respective transmit power of the interfering transmitter at the initial time and a respective path loss from the interfering transmitter to the receiver at the initial time.

10. The apparatus of claim 8, wherein, to determine the predicted SINR ratio, the at least one memory and the computer program code are configured to, with the at least one processor, cause the apparatus to at least:
  determine, based on the total round trip latency, predicted information associated with the predicted channel quality; and
  determine, based on the predicted information associated with the predicted channel quality, the predicted SINR ratio.

11. The apparatus of claim 10, wherein the predicted information associated with the predicted channel quality comprises:
  a transmit power of the transmitter at a future time for which the predicted channel quality is predicted;
  a path loss from the transmitter to the receiver at the future time; and
  for each of one or more interfering transmitters, a respective transmit power of the interfering transmitter at the future time and a respective path loss from the interfering transmitter to the receiver at the future time.

12. The apparatus of claim 8, wherein
  the value of the variable associated with the quality of the wireless channel is configured to represent an unpredictable part of the measured channel quality and the predicted channel quality.

13. The apparatus of claim 1, wherein the at least one memory and the computer program code are configured to, with the at least one processor, cause the apparatus to at least:
  select, based on the predicted channel quality, a transport format for transmission of data via the wireless channel.

14. The apparatus of claim 13, wherein the at least one memory and the computer program code are configured to, with the at least one processor, cause the apparatus to at least:
  transmit data via the wireless channel based on the transport format.

15. The apparatus of claim 13, wherein the at least one memory and the computer program code are configured to, with the at least one processor, cause the apparatus to at least:
  propagate, toward the transmitter, an indication of the transport format.

16. The apparatus of claim 1, wherein the at least one memory and the computer program code are configured to, with the at least one processor, cause the apparatus to at least:
  propagate, toward the transmitter, an indication of the predicted channel quality.

17. The apparatus of claim 1, wherein the transmitter is a wireless access device, the receiver is a wireless end device, and the wireless channel is a downlink channel from the wireless access device to the wireless end device.

18. The apparatus of claim 1, wherein the transmitter is a wireless end device, the receiver is a wireless access device, and the wireless channel is an uplink channel from the wireless end device to the wireless access device.

19. A non-transitory computer-readable storage medium storing instructions configured to cause an apparatus to at least:
  determine a measured channel quality for a wireless channel between a transmitter and a receiver;
  determine a total round trip latency associated with the wireless channel;
  determine, based on the total round trip latency, a predicted signal-to-interference-and-noise (SINR) ratio for the wireless channel; and
  determine, based on the measured channel quality and the predicted SINR ratio, a predicted channel quality for the wireless channel.

20. A method, comprising:
  determining, by an apparatus, a measured channel quality for a wireless channel between a transmitter and a receiver;
  determining, by the apparatus, a total round trip latency associated with the wireless channel;
  determining, by the apparatus based on the total round trip latency, a predicted signal-to-interference-and-noise (SINR) ratio for the wireless channel; and
  determining, by the apparatus based on the measured channel quality and the predicted SINR ratio, a predicted channel quality for the wireless channel.

* * * * *